United States Patent

Suzuki et al.

[11] 3,893,227
[45] July 8, 1975

[54] AUTOMATIC TOOL CHANGING APPARATUS

[75] Inventors: Noboru Suzuki, Aichi-ken; Yozu Kamiya, Anjo, both of Japan

[73] Assignee: Toyoda Machine Works, Limited, Aichi-ken, Japan

[22] Filed: Aug. 9, 1973

[21] Appl. No.: 387,002

[30] Foreign Application Priority Data
Aug. 31, 1972  Japan............................ 47-87368

[52] U.S. Cl. ................................................. 29/568
[51] Int. Cl. ........................................... B23q 3/157
[58] Field of Search .................................... 29/568

[56] References Cited
UNITED STATES PATENTS

| | | | |
|---|---|---|---|
| 3,266,141 | 8/1966 | Jacobson et al. | 29/568 |
| 3,760,491 | 9/1973 | Zankl et al. | 29/568 |
| R26,827 | 3/1970 | Swanson et al. | 29/568 X |

*Primary Examiner*—Andrew R. Juhasz
*Assistant Examiner*—Z. R. Bilinsky
*Attorney, Agent, or Firm*—Kenyon & Kenyon

[57] ABSTRACT

In an automatic tool changing apparatus adapted for application to a machine tool having a vertical spindle, an intermediate tool transfer device is operable for removing a tool from a tool storage magazine of the apparatus by horizontal movement thereof and for subsequently positioning an axis of the removed tool parallel with the axis of the vertical spindle by the downward swinging motion thereof through 90°. Then a tool transfer device carries out exchanging the tool held in the intermediate tool transfer device for an already used tool held in the vertical spindle.

7 Claims, 8 Drawing Figures

AUTOMATIC TOOL CHANGING APPARATUS

The present invention relates to an automatic tool changing apparatus and more particularly, relates to an automatic tool changing apparatus adapted for application to a machine tool having a vertical spindle.

In a machine having a vertical spindle, it is well known to use an automatic tool changing apparatus to exhange an already used tool held in the spindle of the machine for one of a plurality of tools stored in a tool storage magazine.

The arrangement of a known automatic tool changing apparatus is such that when a tool stored in the tool storage magazine is to be inserted in the vertical spindle, the tool magazine is indexed by a tool index device to a predetermined position where the tool is inserted in a ready station by a sub-arm. Subsequently, the ready station is swung downward by 90° to a position where the new tool in the ready station can be exchanged for a used tool which is in the vertical spindle. Then, the new tool in the ready station and the used tool in the vertical spindle are grasped and rotated, through 180°, by a main arm so that the new tool may be inserted in the vertical spindle. In such an arrangement, the ready station interposed between the sub and main arms has been indispensable.

Therefore, an object of the present invention is to provide an automatic tool changing apparatus which eliminates provision of a ready station so as to simplify the arrangement thereof.

According to the present invention, an automatic tool changing apparatus adapted for application to a machine tool having a vertical spindle comprises a rotatable tool storage magazine adapted for storing a plurality of tools, an intermediate tool transfer device for taking a tool out of the storage magazine by horizontal movement thereof and for subsequently positioning an axis of the tool parallel with an axis of the vertical spindle in a position adjacent to said vertical spindle by downward swinging motion thereof through 90°, and a tool transfer device for exchanging the tool in the intermediate tool transfer device for an already used tool held in said vertical spindle.

The above and other objects, and advantages of the present invention will readily be understood from the ensuing description of a preferred embodiment with reference to the accompanying drawings wherein:

Figure 1:
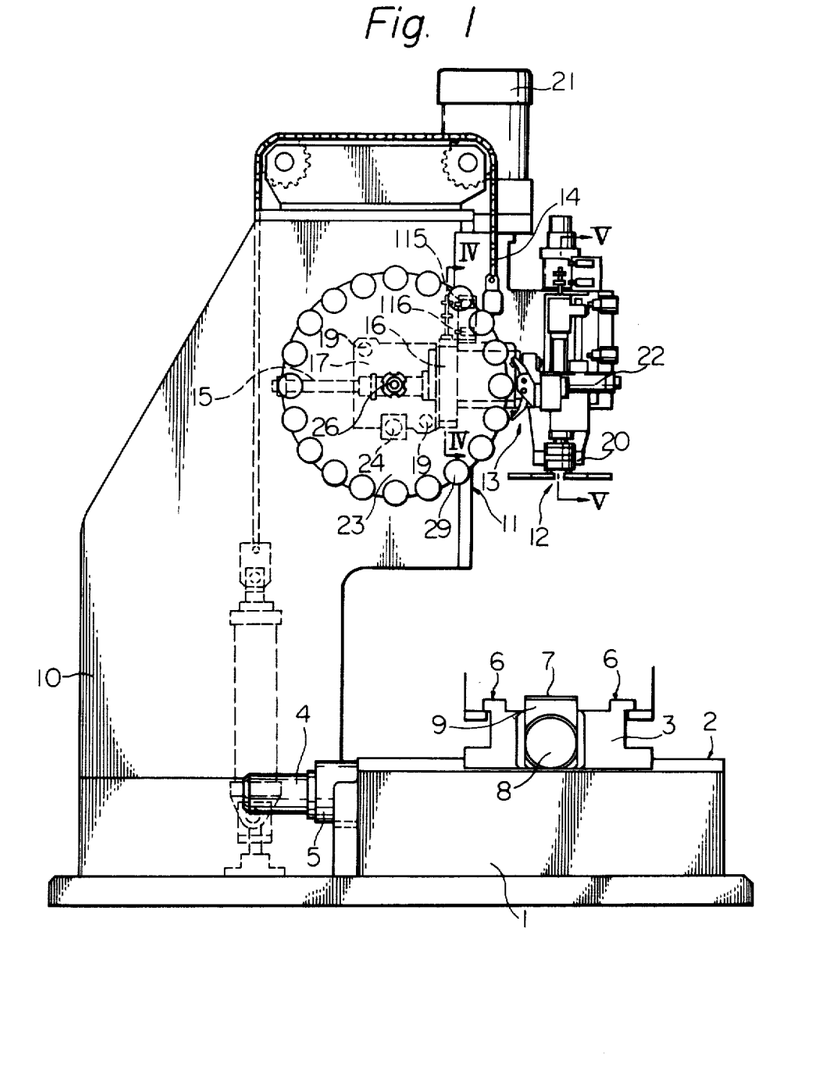
FIG. 1 is a front elevation view of a machine tool provided with an automatic tool changing apparatus according to the present invention.
Figure 2:
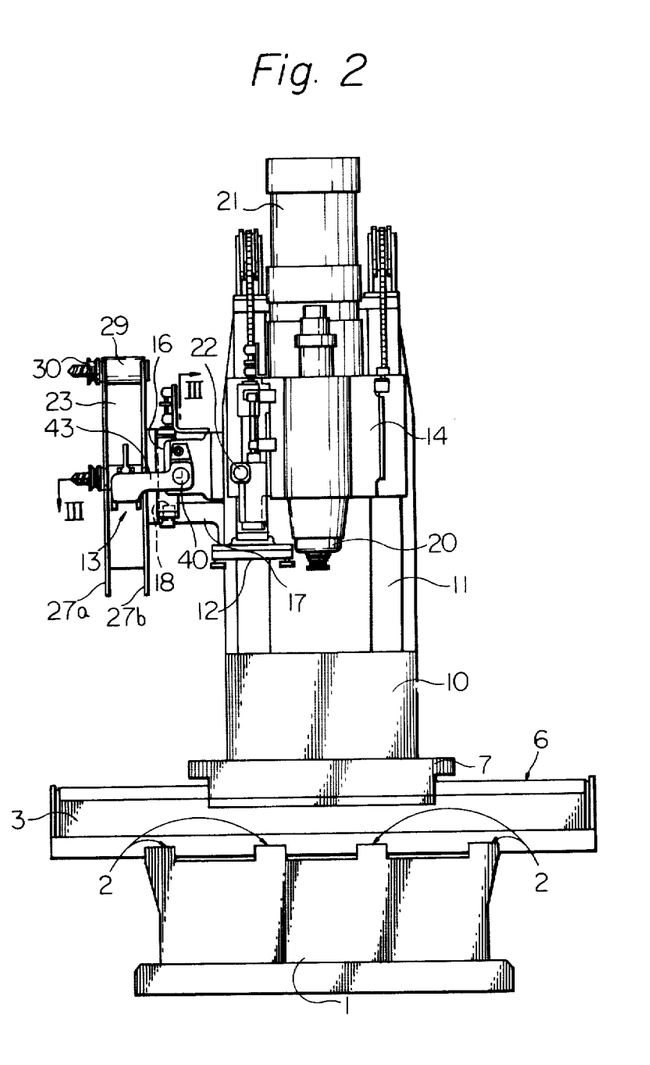
FIG. 2 is a side elevation view of FIG. 1.

Referring to FIGS. 1 and 2, there is shown a machine tool having a bed 1, on the upper surface of which guide ways 2 are formed. On the guide ways 2, a saddle 3 is mounted so that it may be moved by a drive mechanism including a feed motor 4 and a gear box 5. Saddle 3 is provided with guide ways 6 formed on the upper surface thereof. A worktable 7 on which a workpiece to be machined is fixed, is mounted on the guide ways 6 so that table 7 may be moved by another drive mechanism including a feed motor 8 and a gear box 9, in the direction orthogonal to the direction of movement of saddle 3.

At the rear of the bed 1, a column 10 stands which is formed integrally with bed 1 and has guide ways 11 formed on a front face thereof.

A spindle head 14 is vertically slidably mounted on the guide ways 11 above the worktable 7, and the vertical movement of the spindle head 14 with respect to worktable 7 is controlled by a feed mechanism including a feed motor 21. The spindle head 14 is provided with a spindle 20 which is vertically and rotatably journaled in said spindle head 14 and in which one of various kinds of tools stored in a later described tool storage magazine can be selectively inserted. A tool transfer device 12 for a tool 30 and an intermediate tool transfer device 13 for transferring the tool 30 between the tool transfer device 12 and the tool storage magazine 23, are provided for the machine tool so as to be positioned under the spindle head 14. At a side of the column 10, a housing 17 is supported by a pair of pilot bars 19 to be movable in a horizontal direction perpendicular to the direction of the axis of vertical spindle 20. The capability of horizontal movement of the housing 17 is provided by means of a cylinder 24 for removing and inserting a later described tool sleeve into tool storage magazine 23. The tool storage magazine 23 is mounted on the housing 17 by means of a main rotating shaft 26 so as to be capable of rotating in a plane parallel to the axis of vertical spindle 20, and as seen best from FIG. 1, tool storage magazine 23 has an outermost periphery where a plurality of tool sleeves 29 are removably mounted. Each of the tool sleeves 29 on the tool storage magazine 23 holds a tool 30 which is removably inserted in the tool sleeve 29 so that the axis thereof is directed perpendicular to the axis of spindle 20. Further, the tool storage magazine 23 is rotated and indexed, by means of an appropriate index device provided in housing 17, to a predetermined tool removal position where a selected tool 30 required for the next machining operation is removed from tool storage magazine 23.

Figures 7, 8:
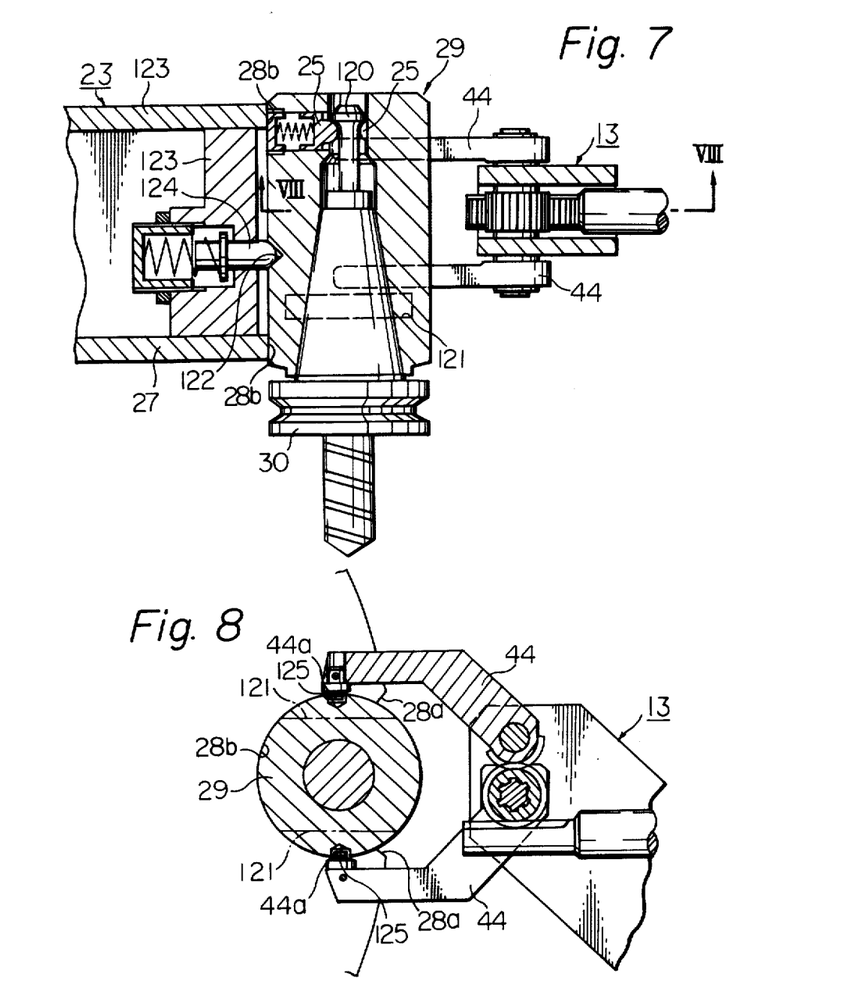
FIG. 7 is a partial and enlarged cross sectional view of a tool storage magazine illustrating a state in which a tool sleeve in the tool storage magazine is grasped by an intermediate tool transfer device.
FIG. 8 is a cross sectional view taken along the line VIII—VIII of FIG. 7.

FIGS. 7 and 8 illustrate a tool holder gripping device provided for the circumference of two circular magazine plates 27a, 27b of said tool storage magazine 23. In FIGS. 7 and 8, the front and rear circular magazine plates 27a, 27b fixedly mounted on the main rotating shaft 26 can carry out three motions of forward and reverse rotations and stop of the rotations under control of a feed motor (not shown) associated with the main rotating shaft 26 and an appropriate index mechanism (not shown). The two circular magazine plates 27a, 27b are further provided with respective opening portions 28a, 28a and support ends 28b, 28b of arc shape for supporting tool sleeves 29 received from the opening portions 28a, 28a, which are equidistantly formed in the circumference of said both plates 27a, 27b. Tool 30 together with a holder for holding the tool 30 is fitted in tool sleeve 29 so that a pull stud 120 is positively engaged with spring-loaded detent pins 25 provided in tool sleeve 29. The tool sleeve 29 itself is provided with the outer round surface fitting in support ends 28b, 28b so as to be rigidly held by both magazine plates 27a, 27b. The tool sleeve 29 is also provided with two recesses 121 of rectangular cross sections which are formed in the front portion thereof so that it is readily removed from and inserted into tool storage magazine 23 by intermediate tool transfer device 13 without interferring with the two opening portions 28a. That is to say, the two recesses 121 of tool sleeve 29 are formed so that they may be aligned with opening portions 28a of front magazine plate 27a when the housing 17 is withdrawn by cylinder 24 and as a result, the interference between tool sleeve 29 and the opening portion 28a of front magazine plate 27a can be avoided when the tool sleeve 29 is removed from or inserted into tool storage magazine 23. It should be noted that the withdrawal of housing 17 also makes it possible to avoid interference between tool sleeve 29 and the opening portion 28a of rear magazine plate 27b since the opening portion 28a of rear magazine plate 27b comes to the outside of the rear end of tool sleeve 29. From FIG. 7, it will also be seen that tool sleeve 29 is provided with a setting hole 122 formed in the part which faces tool storage magazine 23, and the setting hole 122 is engaged with a spring-loaded detent pin 124 provided for a detent block 123 secured to the above-mentioned two magazine plates 27a, 27b so that rigid support of tool sleeve 29 in tool storage magazine 23 may be completed. Further, tool sleeve 29 is also provided with vertical holes 125 formed in the upper and lower surfaces thereof and with which projections 44a of later described clamp fingers 44 of intermediate tool transfer device 13 vertically engage between two front and rear magazine plates 27a, 27b so that intermediate tool transfer device 13 is capable of clamping tool sleeve 29 upon transferring to tool 30 together with the tool sleeve 29.

Figure 3:
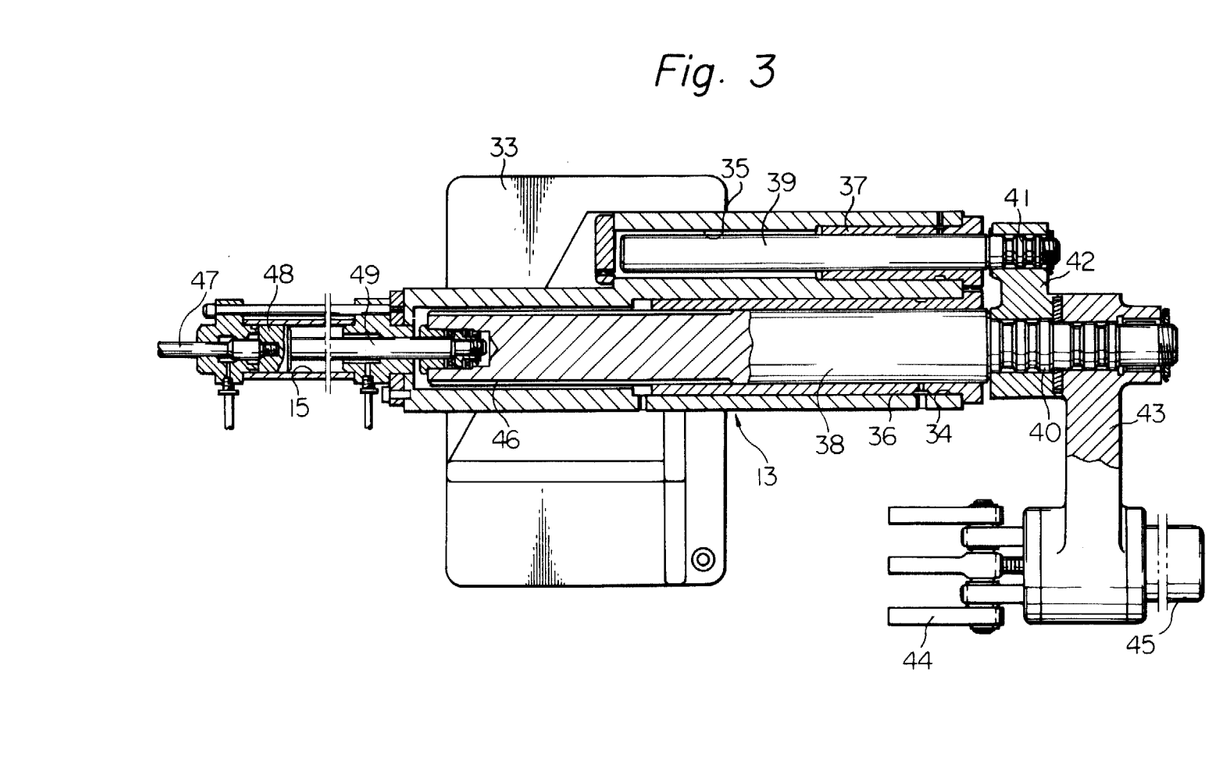
FIG. 3 is a cross sectional view taken along the line III—III of FIG. 2.

The intermediate tool transfer device 13 will be explained in detail with reference to FIGS. 3 and 4.

A body 33 of an intermediate tool transfer device 13 is secured to a side of the column 10 of the machine tool. The body 33 is provided with two parallel through-bores 34 and 35 formed therein to be orthogonal with both centers about which spindle 20 and tool storage magazine rotate respectively. In the through-bore 34, a shaft 38 is inserted by way of a bush member 36 to be rotatable about and slidable along the axis of the through-bore 34. The shaft 38 is provided with teeth 46 formed in one end (rear end) thereof and serving as a pinion. As is shown in FIG. 3, the pinion teeth 46 are longitudinally extended along the axis of shaft 38 in order that engagement of the pinion teeth 46 with a later described rack 53 can be maintained even if shaft 38 carries out sliding movement in the direction along the axis thereof. The shaft 38 is also provided with an extension 40 formed in the front end thereof. The extension 40 is provided with a connecting member 42 mounted thereon in a state such that the extension 40 is free to rotate relative to the member 42. This connecting member 42 is provided with an extended part in which the connecting member 42 is connected with an extension 41 of a guide rod 39 which is slidably fitted in the through-bore 35 by way of a bush 37. Further, it is shown that a sub-arm 43 hangs on shaft 38 through the firm connection of one end of the sub-arm 43 with the extension 40 of shaft 38.

The sub-arm arm 43 is provided with clamp fingers 44 for releasably clamping a tool sleeve 29 and tool 30 held in the tool sleeve, which are stored in tool storage magazine 23, the clamping action of clamp fingers 44 being driven by a cylinder 45. A cylinder 15 is secured to the rear part of the body 33 by means of bolts and screws so that a longitudinal axis of the cylinder 15 is concentric with the central axis of the through-bore 34. The cylinder 15 is provided with a piston 48 slidably inserted in the internal bore of cylinder 15 and having a piston rod 49 extending from an internal end of the piston 48. Said piston rod 49 is connected to the rear end of the shaft 38. An outer end of piston 48 is provided with a dog bar 47 threadedly connected thereto, and the dog bar 47 has dogs (not shown) which are threadedly mounted on the bar 47 and are engageable with limit switches (not shown) so as to define the limits of advance and return of the piston 48. These advances and ruturns of the piston 48 result in the sliding of the shaft 38 within the through-bore 34 in the longitudinal axial direction.

Figure 4:
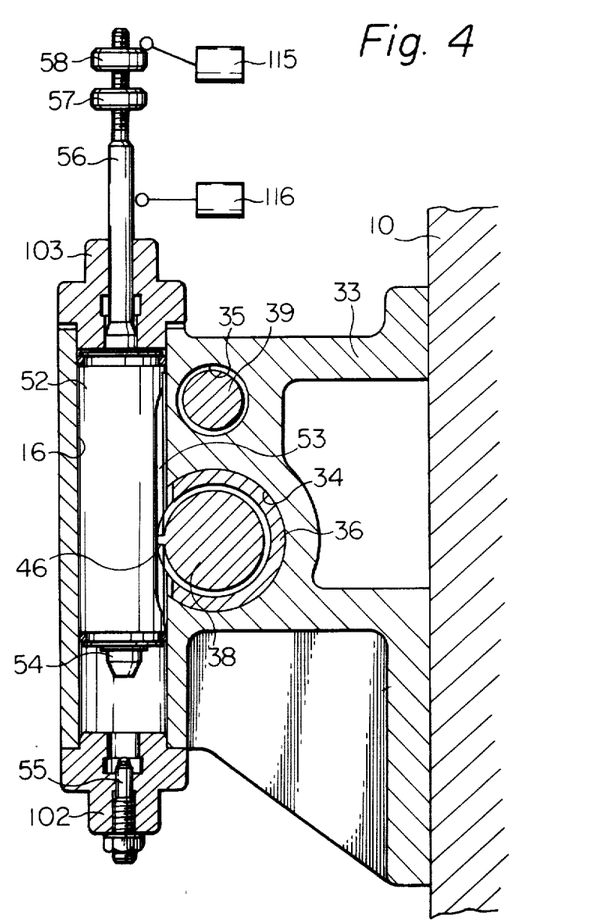
FIG. 4 is a cross sectional view taken along the line IV—IV of FIG. 1.

Referring to FIG. 4, the body 33 is also provided with a cylinder bore 16 formed therein in a direction perpendicular to the through-bore 34. The cylinder bore 16 is provided with a piston 52 slidably inserted in the bore 16 and having rack 53 which are formed in the outer surface of the piston 52. The rack 53 is engaged with the pinion 46.

Caps 102 and 103 are attached to the opposite ends of the cylinder bore 16 so as to close the bore. The cap 102 is provided with a stop 55 threaded therein. This stop 55 is arranged so that it is capable of meeting a projection 54 formed on one end of the piston 52. A dog bar 56 projects from the other end of the piston 52, and this dog bar 56 has threaded thereon dogs 57 and 58 which are engageable with limit switches 115 and 116 for defining the limitations of the advance and return of the piston 52.

The tool transfer device 12 will now be described with reference to FIGS. 1, 2, 5, and 6. Briefly, the tool transfer device 12 operates in a manner such that when it grasps a used tool 30 held in the spindle 20 and a subsequent working tool 30, which is inserted in a tool sleeve 29 and is transferred to the tool change position together with the sleeve 29, it carries out vertical downward movement until the respective tools are completely removed from spindle 20 and the tool sleeve 29. After this the tool transfer device 12 turns about its vertical axis through 180 degrees while holding both tools 30. Then, the device 12 carries out vertical upward movement until the subsequent working tool 30 is inserted in the spindle 20. After completion of the insertion of the tool in the spindle 20, the tool transfer device leaves spindle 20 so that the machine tool can start a subsequent machining process.

Figure 5:
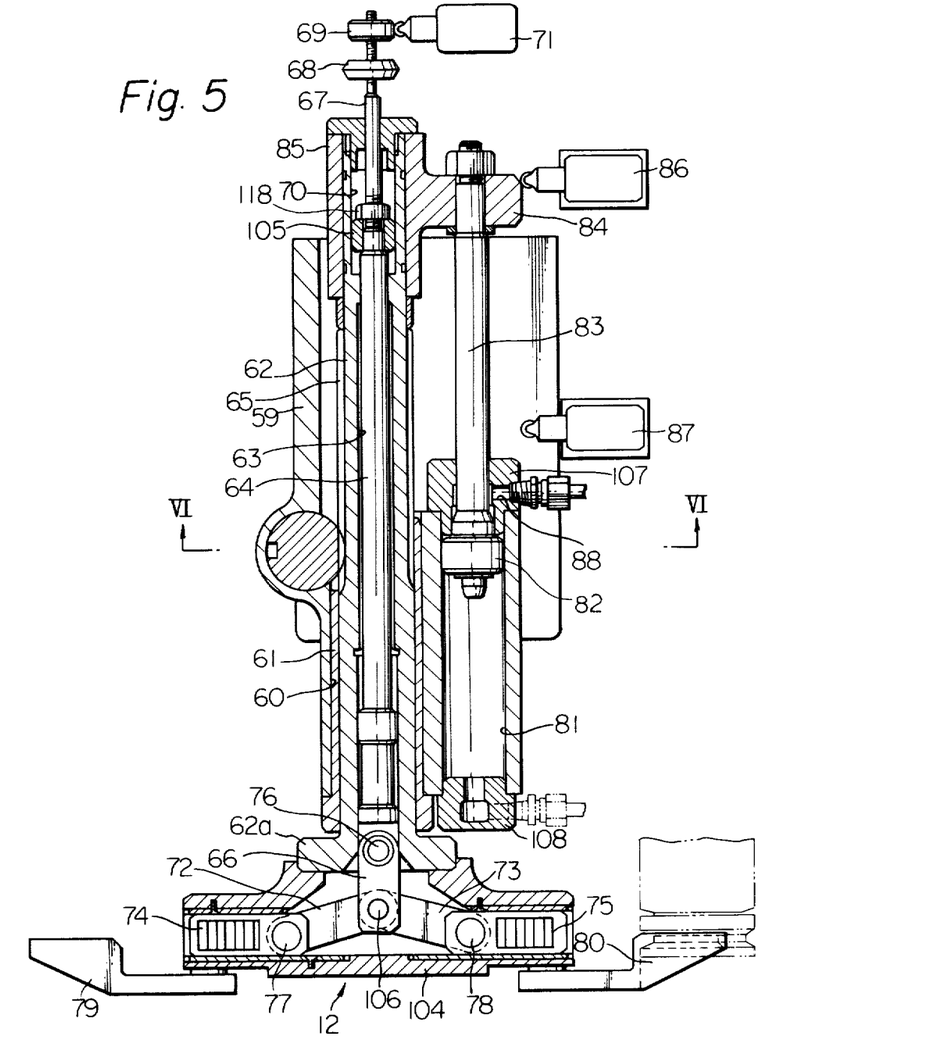
FIG. 5 is a cross sectional view taken along the line V—V of FIG. 1.
Figure 6:
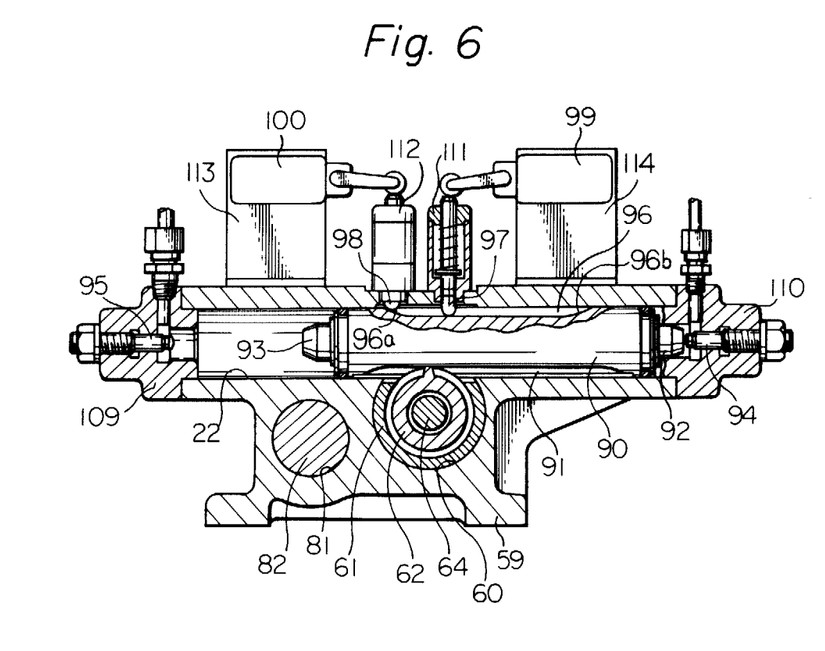
FIG. 6 is an enlarged cross sectional view taken along the line VI—VI of FIG. 5.

Referring to FIGS. 5 and 6, the body 59 of the tool transfer device 12 is secured to a side of the previously described spindle head 14, and is provided with a through-bore 60 and a cylinder bore 81 formed therein. These two bores extend in parallel with each other and also in parallel with the vertical axis of spindle head 14. A slide sleeve 62 is fitted in the through-bore 60, by way of a bush 61, so as to be free to slide vertically. The slide sleeve 62 is provided with a longitudinal bore 63 extending along the central axis of the sleeve 62, a flange part 62a formed in the lowermost end thereof, and a cylinder bore 70 formed in the uppermost end thereof. The flange part 62a is provided with a main arm 104 fixedly connected thereto which has a pair of pawls 79 and 80 for clamping tools 30. The main arm 104 is provided with a pair of slide members 74 and 75 which are both slidably fitted within the main arm 104. Each of the slide members 74 and 75 has racks formed in its opposite side faces, and the sliding movements of slide members 74 and 75 are accompanied by clamping and releasing motions of pawls 79 and 80. The throughbore 63 of slide sleeve 62, which has a diameter smaller than that of cylinder bore 70, is provided with a movable bar 64 inserted therein. The movable bar 64 has an upper end connected to the piston 105 within the cylinder bore 70. The connection between the movable bar 64 and the piston 105 is attained by tightening a nut 118 engaged with a screw thread of movable bar 64. The lower end of movable bar 64 has a connecting member 66 pivotally linked thereto, by means of a pivotal pin 76. The connecting member 66 is also pivotally linked to a pair of other connecting members 72 and 73, by means of a pivotal pin 106. The connecting members 72 and 73 are pivotally linked to the slide members 74 and 75, respectively. The above-mentioned upper end of the movable bar 64 is provided with a dog bar 67 which extends vertically upward and has a screw thread part in its uppermost end. Dogs 68 and 69, which respectively operate a limit switch 71 defining the limits of advance and return of piston 105, are adjustably engaged with the screw thread part of dog bar 67, respectively. Therefore, adjusting the positions of dogs 68 and 69 along dog bar 67 allows adjustment of the magnitude of the vertical movement of the piston 105.

The slide sleeve 62 is provided with teeth 65 formed in the outer surface thereof and serving as a pinion. The pinion teeth 65 engaging with a later described rack 91, extend longitudinally in the axial direction of the sleeve 62 so that the vertical sliding of the sleeve 62 may not cause disengagement between pinion teeth 65 and the rack 91.

The cylinder bore 81 is closed by caps 107 and 108 attached to the opposite ends thereof, and is provided with a piston 82 slidably inserted therein. The piston 82 is provided with a piston rod 83 which is formed so as to be integral with the piston 82 and has an uppermost end to which an extension 84 of a connecting member 85, fixed to the above-mentioned sleeve 62, is fixedly connected. Further, as shown in FIG. 5, the extension 84 is provided with a front edge which is formed so as to be engageable with limit switches 86 and 87 for defining the limits of vertical upward and downward movements of piston 82, the limit switches being secured to the spindle head 14.

As is shown in FIG. 6, the body 59 of the tool transfer device 12 is further provided with a cylinder bore 22 formed therein in such a manner that the longitudinal axis of the bore 22 is orthogonal with that of the bore 60. In the cylinder bore 22, a piston 90 having a rack 91 is slidably inserted. The rack 91 of the piston 90 engages with the pinion teeth 65 of the sleeve 62 in the bore 60. Caps 109 and 110 respectively fixed to the opposite ends of the cylinder bore 22, close the bore 22 and are provided with stops 95 and 94 secured in the caps 109 and 110, respectively. These stops 95 and 94 are arranged so as to meet respective projections 93 and 92 provided at opposite ends of the piston 90.

Supports 111 and 112 are provided for body 59 of the tool transfer device 12, and slidably support actuating rods 97 and 98, respectively. Respective actuating rods 97 and 98 are provided with their lower ends placed in a groove 96 which is formed in the piston 90 so as to extend along the axis of said piston 90 while having longitudinally spaced ends 96a and 96b. The actuating rods 97 and 98 are further provided with upper ends projecting from supports 111 and 112, and contacting limit switches 99 and 100 secured to body 59 by means of brackets 113 and 114. Thus, it will be noted that actuating rod 97 and 98 is pushed upwardly by end 96b or 96a of groove 96, depending upon the sliding of piston 90 and, as a result, limit switch 99 or 100 is operated by actuating rod 97 or 98. That is to say, the limits of sliding movement of piston 90 are defined by the operation of limit switches 99 and 100. It should be noted that the above-mentioned stops 94 and 95 are adjusted so that piston 90 may not slide to the extent that it exceeds the limits.

The tool operation of the apparatus according to the above-mentioned arrangement will now be explained.

When a used tool 30 being held in spindle 20 should be exchanged for a subsequent tool 30 in tool storage magazine 23, cylinder 45 of intermediate tool transfer device 13 is first operated, and clamp fingers 44 clamp the tool sleeve 29 holding the subsequent tool 30 stored in the tool storage magazine 23.

Then, cylinder 24 is operated so as to horizontally pull back housing 17 together with the tool storage magazine 23 until the opening 28a of the front magazine plate 27a aligns with recess 121 of the tool sleeve 29 clamped by clamp fingers 44 of the intermediate tool transfer device 13. In addition, the rear magazine plate 27b is separated from the rear end of the tool sleeve 29. Subsequently, pressurized oil is applied to the left chamber of cylinder 15, so as to move piston 48 rightwards. As a result, sub-arm 43 of device 13 is horizontally moved in the outwardly radial direction of the tool magazine 23 so that the tool sleeve 29 together with the subsequent tool 30 are removed from the tool storage magazine 23. When piston 48 comes to the end of its rightward movement, piston 52 of cylinder 16 is subsequently advanced, so that sub-arm 43 is rotated by means of rack 53, pinion 46 and shaft 38, through 90 degrees in a counterclockwise direction in FIG. 2. Thus, the above-mentioned tool sleeve 29 and the subsequently tool 30, which are held by clamp fingers 44 of sub-arm 43, come into a position in which the axes of both the tool sleeve 29 and the tool 30 are in parallel with the axis of spindle 20, and wait these for the next tool change operation.

When the tool 30, being held in spindle 20, completes its working and a command for a tool change operation is provided for the apparatus, the rotational motion of spindle 20 is stopped. Then, the spindle head 14 is lifted up until the used tool 30 held in spindle 20 comes to the tool change position. When spindle head 14 is lifted up to the uppermost end thereof, piston 105 of cylinder 70 is operated to move downward in FIG. 5. Together with piston 105, movable bar 64 is also moved in the same downward direction. As a result, pawls 79 and 80, provided at the opposite ends of main arm 104, are driven by means of connecting members 66, 72, and 73, and slide members 74 and 75 to grasp the subsequent tool 30 held in the tool sleeve 29 awaiting the tool change and the used tool 30 held in the spindle 20. The grasp of both tools 30 by pawls 79 and 80 of main arm 104 is confirmed by confirmation of completion of the downward movement of movable bar 64 by limit switch 71. If the confirmation is provided by operation of limit switch 71, pressurized oil is fed into cylinder 81 through a supply port 88 so as to move piston 82. Therefore, pawls 79 and 80 grasping the subsequent tool and the used tool are moved downwards along the axis of spindle 20 by means of connecting member 85 and slide sleeve 62. As a result, the used tool 30 and the subsequent tool 30 are removed from the tool sleeve 29 and spindle 20, respectively. When pawls 79 and 80 are moved downwards until the edge of the extension 84 pushes and actuates limit switch 87, main arm 104 is stopped in its downward movement. When the downward movement of main arm is confirmed by operation of limit switch 87, pressurized oil is fed to cylinder bore 22 so as to move piston 90. The movement of piston 90 causes the main arm 104 to rotate 180° via rack 91, pinion teeth 65 and sleeve 62. Thereafter, pressurized oil is fed to the lower chamber of cylinder 81 to move piston 82 upwards and thereby pull back main arm 104. As a result, the subsequent tool 30 is inserted in the spindle 20 and the used tool 30 is inserted in the tool sleeve 29 clamped by clamp fingers 44 of the intermediate tool transfer device 13. Subsequently, the grasps of both tools 30 by pawls 79 and 80 are released by the pulling back of piston 105 within cylinder 70. Then, piston 52 within cylinder 16 is pulled back to rotate sub-arm 43 of the intermediate tool transfer device 13 in the clockwise direction in FIG. 2. Thereafter, pressurized oil is fed to the right chamber of cylinder 15 to move sub-arm 43 in the leftward direction so that the tool sleeve 29 incorporating the above-mentioned used tool 30 is re-inserted in the re-insertion of the tool sleeve 29 29 together with the used tool 30, cylinder 24 is again operated to horizontally advance tool storage magazine 23 so that support ends 28b and 28b of the front and rear magazine plates 27a and 27b engage with the re-inserted tool sleeve 29 so as to support the sleeve 29. Then, cylinder 45 is operated to release the grasp clamp fingers 44 on the tool sleeve 29 holding the used tool.

The rotation of the tool storage magazine 23 is then restarted so that a tool sleeve 29 having a tool 30 which is to be used in the further subsequent machining operation, is indexed to the position where the tool sleeve 29 is removed from tool storage magazine 23. When the tool sleeve 29 together with the further subsequent tool 30 is indexed to this position, cylinder 45 is again operated so that clamp fingers 44 clamp the tool sleeve 29 holding the subsequent tool 30. Thereafter, the tool sleeve 29 and the tool 30 are brought to the tool change position in the manner described above. During the above restarting of the tool change for the further subsequent tool 30, spindle head 14 comes down to a position adjacent to a workpiece on worktable 7 and starts the machining operation to be carried out by the changed tool 30 in spindle 20.

It will now be understood that the arrangement and the operation of the automatic tool change apparatus according to the present invention, can provide the following advantages.

i. As provision of a ready station is eliminated between the sub-arm of the intermediate tool transfer device 13 and the main arm of tool transfer device 12, a decrease in the number of elements of the apparatus is provided, and simplification of the arrangement of the apparatus compared with the prior art and shortening of each tool changing cycle can be attained.

ii. The symmetric arrangement of pawls 79 and 80 of the tool transfer device 12 with respect to movable bar 64 enables equivalent forces to be exerted in the clamping of tools 30.

iii. The arrangement of horizontal movement of tool storage magazine 23 can decrease the number of motions of the intermediate tool transfer device 13 compared with the prior art.

We claim:

1. An automatic tool changing apparatus adapted for application to a machine tool having a vertical spindle comprising:

a rotatable tool storage magazine adapted for removably storing a plurality of horizontally disposed tools, said tool storage magazine being horizontally retractable, and including means for allowing said desired tool to be removed by an intermediate tool transfer device when said tool storage magazine is retracted;

said intermediate tool transfer device being adapted for removing a desired tool from the plurality of tools in the tool storage magazine by horizontal motion thereof from said tool storage magazine and for subsequently positioning an axis of the tool in parallel with an axis of the vertical spindle in a position adjacent to the vertical spindle of the machine tool by downward pivotal motion thereof through 90°; and a tool transfer device of exchanging the desired tool in the intermediate tool transfer device for an already used tool held in said vertical spindle, wherein each of said plurality of tools being stored in said tool magazine is held in a tool sleeve having vertically spaced recesses, and wherein said means of said tool storage magazine comprises vertically disposed and horizontally spaced front and rear magazine plates having a plurality of paired support seats disposed equiangularly on the peripheries of said magazine plates for supporting said plurality of tools, said seats of said front magazine plates having openings, with one of which vertically spaced recesses of a tool sleeve holding the desired tool are aligned when the tool sleeve is clamped by said intermediate tool transfer device and, said tool magazine is retracted so that said tool sleeve together with said desired tool is free to pass through said opening.

2. An automatic tool changing apparatus adapted for application to a machine tool having a vertical spindle comprising:

a rotatable tool storage magazine adapted for removably storing a plurality of horizontally disposed tools;

an intermediate tool transfer device adapted for removing a desired tool from the plurality of tools in the tool storage magazine by horizontal motion thereof from said tool storage magazine and for subsequently positioning an axis of the tool in parallel with an axis of the vertical spindle in a position adjacent to the vertical spindle of the machine tool by downward pivotal motion thereof through 90°;

said intermediate tool transfer device including a horizontally longitudinal shaft and a sub-arm fixedly mounted on said shaft and having clamping fingers adapted for grasping a tool, said longitudinal shaft being slidable for exerting said horizontal motion on said sub-arm, and further being rotatable for exerting said pivotal motion on said sub-arm; and a tool transfer device for exchanging the desired tool in the intermediate tool transfer device for an already used tool held in said vertical spindle.

3. An automatic tool changing apparatus as set forth in claim 2, wherein the tool storage magazine is horizontally rectactable, and said tool storage magazine includes means for allowing said desired tool to be removed by said intermediate tool transfer device when said tool storage magazine is retracted.

4. An automatic tool changing apparatus as set forth in claim 2, wherein each of said plurality of tools being stored in said tool magazine is held in a tool sleeve having vertically spaced recesses, and wherein said means of said tool storage magazine comprises vertically disposed and horizontally spaced front and rear magazine plates having a plurality of paired support seats disposed equiangularly on the peripheries of said magazine plates for supporting said plurality of tools, and seats of said front magazine plate having openings, with one of which vertically spaced recesses of a tool sleeve holding the desired tool are aligned when the tool sleeve is clamped by said intermediate tool transfer device and, said tool magazine is retracted so that said sleeve together with said desired tool is free to pass through said opening.

5. An automatic tool changing apparatus as set forth in claim 2, wherein said tool transfer device comprises a vertically longitudinal bar slidably fitted in a vertical sleeve means, a link mechanism pivotally connected to a lower end of the bar, and a pair of diametrically disposed and horizontally slidable members, each of which has an end pivotally connected to said link mechanism and another end associated with pawls, said pawls being simultaneously releasably gripping the desired tool positioned adjacent to said spindle and an already used tool held in said spindle in response to sliding motion of said bar within said sleeve means, immediately before the start of the exchange of said desired and already used tools.

6. An automatic tool changing apparatus as set forth in claim 5, wherein said sleeve means are vertically movable to allow said desired and already used tools gripped by said pawls to be removed from said intermediate tool transfer device and said vertical spindle, respectively, and subsequently said sleeve means are rotatable to allow said desired and already used tools gripped by said pawls to rotate through 180 degrees, then said sleeve means being further vertically but reversely movable to allow said desired and already used tools gripped by said pawls to be inserted in said vertical spindle and said intermediate tool transfer device, respectively.

7. A vertical spindle type machine tool having a bed, an upright column mounted on the bed, a spindle head slidably mounted on the column and provided with a vertical spindle which is rotatably held by the spindle head above a worktable, and a tool changing means for exchanging a used tool in the spindle for a desired tool comprising:

a tool magazine mounted on said column to be rotatable in a vertical plane parallel with the vertical axis of the spindle, and removably storing a plurality of tools in the outer periphery of the tool magazine, the tools being held by respective tool sleeves thereby maintaining their axes perpendicular to the vertical axis of the spindle;

a tool magazine index means for rotating said tool magazine and for indexing said desired tool stored in said tool magazine to a predetermined tool transfer position adjacent to said tool magazine;

an intermediate tool transfer means for clamping said desired tool together with the tool sleeve indexed to the predetermined tool transfer position and for transferring said desired tool to a predetermined tool change position, the intermediate tool transfer means being horizontally movable to remove said desired tool from said tool magazine and subsequently being rotatable downward through 90° to position said desired tool at the predetermined tool change position in a position such that the axis of said desired tool is parallel with said vertical axis of the spindle; and a tool transfer means for exchanging the used tool held in said spindle for said desired tool positioned at said tool change position, said tool transfer means being rotatable through 180° in a horizontal plane after the vertical downward advance thereof while holding said desired tool removed from said tool sleeve grasped by said intermediate tool transfer means and said used tool removed from said spindle, said tool transfer means further being vertically upwardly retractable to insert said desired tool into said spindle after said 180° rotation thereof.

* * * * *

UNITED STATES PATENT AND TRADEMARK OFFICE
CERTIFICATE OF CORRECTION

PATENT NO. : 3,893,227
DATED : July 8, 1975
INVENTOR(S) : Noboru Suzuki & Yozu Kamiya It is certified that error appears in the above-identified patent and that said Letters Patent are hereby corrected as shown below:

Col. 4, Line 19: Change "ruturns" to --returns--.

Col. 6, Line 21: After "The tool" insert --change--.

Col. 7, Lines 35-36: After "re-inserted in the" insert --tool storage magazine 23. After--; Delete "29" second occurance.

Claim 3, line 11: change "retactable" to --retractable--.

Signed and Sealed this twenty-fifth Day of November 1975

[SEAL]

Attest:

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 3,893,227
DATED : July 8, 1975
INVENTOR(S) : Noboru Suzuki and Yozi Kamiya It is certified that error appears in the above-identified patent and that said Letters Patent are hereby corrected as shown below:

Please correct the spelling of inventor's name from "Yozu Kamiya" to --Yozi Kamiya--.

Signed and Sealed this seventeenth Day of February 1976

[SEAL]

*Attest:*

RUTH C. MASON
*Attesting Officer*

C. MARSHALL DANN
*Commissioner of Patents and Trademarks*